US011556105B2

United States Patent
Cooley et al.

(10) Patent No.: US 11,556,105 B2
(45) Date of Patent: Jan. 17, 2023

(54) GRAPH DATA ENRICHMENT

(71) Applicant: Mapped Inc., El Segundo, CA (US)

(72) Inventors: Shaun Cooley, El Segundo, CA (US); Jose De Castro, San Francisco, CA (US); Jason Koh, San Diego, CA (US)

(73) Assignee: MAPPED INC., El Segundo, CA (US)

( * ) Notice: Subject to any disclaimer, the term of this patent is extended or adjusted under 35 U.S.C. 154(b) by 0 days.

(21) Appl. No.: 17/372,251

(22) Filed: Jul. 9, 2021

(65) Prior Publication Data
US 2022/0147569 A1    May 12, 2022

Related U.S. Application Data

(60) Provisional application No. 63/112,268, filed on Nov. 11, 2020.

(51) Int. Cl.
*G05B 19/05*    (2006.01)
*G06K 9/62*    (2022.01)
(Continued)

(52) U.S. Cl.
CPC .......... *G05B 19/054* (2013.01); *G05B 19/05* (2013.01); *G06F 9/54* (2013.01); *G06F 16/212* (2019.01);
(Continued)

(58) Field of Classification Search
None
See application file for complete search history.

(56) References Cited

U.S. PATENT DOCUMENTS 5,663,891 A * 9/1997 Bamji .................. G06F 30/30
716/133
5,729,466 A * 3/1998 Bamji .................. G06F 30/39
716/135
(Continued)

FOREIGN PATENT DOCUMENTS

WO       WO-9913418 A1    3/1999
WO    WO-2020089259 A1    5/2020
(Continued)

OTHER PUBLICATIONS

Cheong. Four ways to quantify synchrony between time series data. Towards Data Science Available athttps://towardsdatascience.com/four-ways-to-quantify-synchrony-between-time-series-data-b99136c4a9c9 (May 13, 2019).
(Continued)

*Primary Examiner* — Kim T Nguyen
(74) *Attorney, Agent, or Firm* — Wilson Sonsini Goodrich & Rosati

(57) ABSTRACT

Described are platforms, systems, and methods for real-time enrichment of vertices, edges, and related data within a graph database. The platforms, systems, and methods maintain a graph database comprising a representation of a current state of an automation environment comprising a plurality of data sources, wherein the data sources are represented as vertices in the graph database and relationships between the individual data sources are represented as edges in the graph database; operate a plurality of software agents, each software agent configured to perform operations comprising: applying an algorithm to identify patterns in the graph database; and generating a specific data enrichment based on one or more identified patterns; and contribute the generated data enrichment back to the graph database.

22 Claims, 5 Drawing Sheets

(51) Int. Cl.
*G06N 20/00* (2019.01)
*G06F 16/25* (2019.01)
*G06F 16/21* (2019.01)
*H04L 41/12* (2022.01)
*G06F 16/901* (2019.01)
*G06F 9/54* (2006.01)

(52) U.S. Cl.
CPC ........ *G06F 16/254* (2019.01); *G06F 16/9024* (2019.01); *G06K 9/6263* (2013.01); *G06K 9/6278* (2013.01); *G06N 20/00* (2019.01); *H04L 41/12* (2013.01); *G05B 2219/1215* (2013.01); *G05B 2219/13129* (2013.01); *G05B 2219/15012* (2013.01); *G05B 2219/163* (2013.01)

(56) References Cited

U.S. PATENT DOCUMENTS

| | | |
|---|---|---|
| 7,606,890 B1 | 10/2009 | Baier et al. |
| 8,773,437 B1 | 7/2014 | Goldman et al. |
| 8,819,206 B2 * | 8/2014 | Bandi ............... H04L 41/5045 709/224 |
| 9,667,641 B2 | 5/2017 | Muddu et al. |
| 10,019,536 B2 * | 7/2018 | Hong ................ G06F 16/2246 |
| 10,044,630 B2 | 8/2018 | Kriegesmann et al. |
| 10,216,706 B1 * | 2/2019 | Bonk ................ G06F 16/9024 |
| 10,353,596 B2 | 7/2019 | Zhou |
| 10,540,383 B2 | 1/2020 | Cobbett et al. |
| 10,901,373 B2 | 1/2021 | Locke et al. |
| 10,997,195 B1 | 5/2021 | Sekar |
| 11,455,287 B1 | 9/2022 | Hillion et al. |
| 2004/0049699 A1 | 3/2004 | Griffith et al. |
| 2004/0210654 A1 | 10/2004 | Hrastar |
| 2004/0260518 A1 | 12/2004 | Polz et al. |
| 2007/0208440 A1 | 9/2007 | Bliss et al. |
| 2009/0100407 A1 | 4/2009 | Bouillet et al. |
| 2010/0014432 A1 | 1/2010 | Durfee et al. |
| 2010/0257535 A1 | 10/2010 | Badovinatz et al. |
| 2011/0004631 A1 * | 1/2011 | Inokuchi ............. G06F 16/9024 707/798 |
| 2011/0087522 A1 | 4/2011 | Beaty et al. |
| 2011/0179027 A1 | 7/2011 | Das et al. |
| 2011/0295903 A1 | 12/2011 | Chen |
| 2012/0084422 A1 * | 4/2012 | Bandi ................ H04L 41/5045 709/223 |
| 2012/0158933 A1 | 6/2012 | Shetty et al. |
| 2013/0124465 A1 | 5/2013 | Pingel et al. |
| 2013/0232123 A1 | 9/2013 | Ahmed et al. |
| 2014/0122806 A1 | 5/2014 | Lin et al. |
| 2014/0277604 A1 | 9/2014 | Nixon et al. |
| 2015/0074078 A1 | 3/2015 | Roche et al. |
| 2015/0074117 A1 | 3/2015 | Gorelik et al. |
| 2015/0095770 A1 | 4/2015 | Mani et al. |
| 2015/0180891 A1 | 6/2015 | Seward et al. |
| 2015/0256635 A1 | 9/2015 | Casey et al. |
| 2015/0281105 A1 | 10/2015 | Vaderna et al. |
| 2016/0019228 A1 * | 1/2016 | Hong ................ G06F 16/2246 707/624 |
| 2016/0098037 A1 | 4/2016 | Zornio et al. |
| 2016/0132538 A1 | 5/2016 | Bliss et al. |
| 2016/0342707 A1 | 11/2016 | Drobek et al. |
| 2016/0373481 A1 | 12/2016 | Sultan et al. |
| 2017/0085438 A1 | 3/2017 | Link et al. |
| 2017/0154080 A1 | 6/2017 | De Smet et al. |
| 2017/0168779 A1 * | 6/2017 | Sevenich ................ G06F 8/456 |
| 2017/0249434 A1 | 8/2017 | Brunner |
| 2017/0286456 A1 | 10/2017 | Wenzel et al. |
| 2018/0173795 A1 | 6/2018 | Cobbett et al. |
| 2018/0219888 A1 | 8/2018 | Apostolopoulos |
| 2018/0219919 A1 | 8/2018 | Crabtree et al. |
| 2018/0232459 A1 | 8/2018 | Park et al. |
| 2019/0057064 A1 * | 2/2019 | Bonk ..................... G06F 17/18 |
| 2019/0108197 A1 * | 4/2019 | Bonk ..................... G06F 3/0486 |
| 2019/0132145 A1 | 5/2019 | O'Hora |
| 2019/0133026 A1 | 5/2019 | Seaman et al. |
| 2019/0158353 A1 | 5/2019 | Johnson et al. |
| 2019/0187643 A1 | 6/2019 | Carpenter et al. |
| 2019/0205148 A1 | 7/2019 | Schur et al. |
| 2019/0220583 A1 | 7/2019 | Douglas et al. |
| 2019/0324831 A1 | 10/2019 | Gu |
| 2019/0384238 A1 | 12/2019 | Songkakul |
| 2020/0004751 A1 | 1/2020 | Stennett et al. |
| 2020/0280565 A1 | 9/2020 | Rogynskyy et al. |
| 2020/0296137 A1 | 9/2020 | Crabtree et al. |
| 2020/0327444 A1 | 10/2020 | Negi et al. |
| 2020/0379992 A1 | 12/2020 | De Smet |
| 2021/0073216 A1 | 3/2021 | Chang et al. |
| 2021/0090694 A1 | 3/2021 | Colley et al. |
| 2021/0133670 A1 | 5/2021 | Cella et al. |
| 2021/0157312 A1 | 5/2021 | Cella et al. |
| 2021/0157671 A1 | 5/2021 | Shastri et al. |
| 2021/0273965 A1 | 9/2021 | Pi et al. |
| 2021/0287459 A1 | 9/2021 | Cella et al. |
| 2021/0293103 A1 | 9/2021 | Olsen et al. |
| 2021/0333762 A1 | 10/2021 | Govindaraj et al. |
| 2022/0156433 A1 | 5/2022 | Laane et al. |

FOREIGN PATENT DOCUMENTS

| | | |
|---|---|---|
| WO | WO-2022059588 A1 | 3/2022 |
| WO | WO-2022103812 A1 | 5/2022 |
| WO | WO-2022103813 A1 | 5/2022 |
| WO | WO-2022103820 A1 | 5/2022 |
| WO | WO-2022103822 A1 | 5/2022 |
| WO | WO-2022103824 A1 | 5/2022 |
| WO | WO-2022103829 A1 | 5/2022 |
| WO | WO-2022103831 A1 | 5/2022 |

OTHER PUBLICATIONS

Co-pending U.S. Appl. No. 17/372,238, inventors Cooley; Shaun et al., filed Jul. 9, 2021.
Co-pending U.S. Appl. No. 17/372,242, inventors Cooley; Shaun et al., filed Jul. 9, 2021.
Co-pending U.S. Appl. No. 17/372,247, inventors Cooley; Shaun et al., filed Jul. 9, 2021.
Co-pending U.S. Appl. No. 17/372,256, inventors Cooley; Shaun et al., filed Jul. 9, 2021.
Co-pending U.S. Appl. No. 17/372,267, inventors Cooley; Shaun et al., filed Jul. 9, 2021.
Co-pending U.S. Appl. No. 17/372,275, inventors Cooley; Shaun et al., filed Jul. 9, 2021.
Grady et al. Robust classification of salient links in complex networks. Nat Commun 3:864 (May 29, 2012).
PCT/US2021/058749 International Search Report and Written Opinion dated Dec. 22, 2021.
PCT/US2021/058756 International Search Report and Written Opinion dated Jan. 11, 2022.
PCT/US2021/058759 International Search Report and Written Opinion dated Dec. 22, 2021.
PCT/US2021/058762 International Search Report and Written Opinion dated Dec. 23, 2021.
PCT/US2021/058768 International Search Report and Written Opinion dated Jan. 24, 2022.
PCT/US2021/058771 International Search Report and Written Opinion dated Jan. 11, 2022.
U.S. Appl. No. 17/372,238 Non-Final Office Action dated Jan. 19, 2022.
U.S. Appl. No. 17/372,247 Non-Final Office Action dated Dec. 13, 2021.
U.S. Appl. No. 17/372,267 Office Action dated Oct. 26, 2021.
U.S. Appl. No. 17/372,242 Office Action dated Nov. 15, 2021.
U.S. Appl. No. 17/372,256 Office Action dated Oct. 29, 2021.
U.S. Appl. No. 17/372,275 Office Action dated Nov. 10, 2021.
George et al. Big data and management. Academy of management Journal 57(2):321-326 (2014). Retrieved on Jan. 8, 2022 from https://journals.aom.org/doi/abs/10.5465/amj.2014.4002?journalCode=amj.

(56) References Cited

OTHER PUBLICATIONS

Kind et al.: Relationship Discovery with NetFlow to Enable Business-Driven IT Management. IEEE Xplore, Conference: Business-Driven IT Management, 2006, pp. 63-70 DOI:10.1109/BDIM.2006.1649212 (2006).
PCT/US2021/058748 International Search Report and Written Opinion dated Feb. 9, 2022.
U.S. Appl. No. 17/372,238 Final Office Action dated Apr. 19, 2022.
U.S. Appl. No. 17/372,242 Final Office Action dated Mar. 4, 2022.
U.S. Appl. No. 17/372,247 Final Office Action dated Apr. 26, 2022.
U.S. Appl. No. 17/372,256 Final Office Action dated Feb. 18, 2022.
U.S. Appl. No. 17/372,267 Final Office Action dated Feb. 9, 2022.
U.S. Appl. No. 17/372,267 Non-Final Office Action dated Jul. 21, 2022.
U.S. Appl. No. 17/372,275 Final Office Action dated Mar. 4, 2022.
U.S. Appl. No. 17/372,267 Final Office Action dated Oct. 24, 2022.
U.S. Appl. No. 17/372,247 Non-Final Office Action dated Nov. 14, 2022.

\* cited by examiner

GRAPH DATA ENRICHMENT

CROSS-REFERENCE TO RELATED APPLICATIONS

This application is related to applications U.S. application Ser. No. 17/372,238, U.S. application Ser. No. 17/372,242, U.S. application Ser. No. 17/372,247, U.S. application Ser. No. 17/372,256, U.S. application Ser. No. 17/372,267, and U.S. application Ser. No. 17/372,275, all filed on the same date, Jul. 9, 2021, the same date on which the present application was filed. This application claims the priority and benefit of U.S. Provisional Application No. 63/112,268, filed Nov. 11, 2020, and entitled: DATA INTEGRATION AND ENRICHMENT PLATFORM FOR AUTOMATED INDUSTRIAL AND COMMERCIAL ENVIRONMENTS. All of these applications are incorporated herein by reference in their entireties.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

The current world of data management of various data sources (e.g., IoT devices) in an automation environment is largely based on the structure of database. In some embodiments, a graph database is utilized to record the relationships between different data sources. Conventionally, vertices (used interchangeable as "nodes" throughout this application) and edges in a graph database are introduced or changed based on observations of the data sources. Once the vertices and edges are stored in a graph database, the structure of the graph database tends to be static and used by downstream applications that make queries against the graph to fetch that structure and associated data. These downstream applications generally perform further processing independently, and the graph does not benefit from such independent downstream processing.

Described herein are platforms, systems, and methods that automatically discover, extract, map, merge, and enrich data found in systems on-premises in automated industrial and commercial environments and cloud systems, and automatically provide feedback and updates back to a graph database, for purposes of providing developers access to normalized, merged, enriched, and up-to-date data and data structure through an API.

The subject matter described herein includes platforms, systems, and methods that significantly improve upon current data storage systems by improving the speed, responsiveness, and performance of, and automating all aspects of: data source discovery, data extraction, mapping of input data to a well-defined ontology, merging the mapped data into a combination graph and timeseries database, enriching the data, providing the enriched data back to the data storage systems, and making the resulting normalized, merged, enriched, and up-to-date data and data structure available to developers through both APIs. The following components, in various embodiments, are needed to implement the platforms, systems, and methods described herein:

Data or data source discovery mechanism;
Data extraction system;
Data mapping mechanism;
Data storage system;
Data enrichment components (software agents); and
Tagging mechanism.

Accordingly, in one aspect, disclosed herein are computer-implemented methods comprising: maintaining a graph database comprising a representation of a current state of an automation environment comprising a plurality of data sources, wherein the data sources are represented as vertices in the graph database and relationships between the individual data sources are represented as edges in the graph database; operating a plurality of software agents, each software agent configured to perform operations comprising: applying an algorithm to identify patterns in the graph database; and generating a specific data enrichment based on one or more identified patterns; and contributing the generated data enrichment back to the graph database. In some embodiments, the graph database comprises a digital twin of the automation environment. In some embodiments, the method further comprises receiving updates to the graph database, each update reflecting a current state of at least one data source of the automation environment. In further embodiments, the updates to the graph database are received as a result of polling of the graph through queries, polling of a changelog, receiving a real-time feed of changes, or a combination thereof. In further embodiments, the polling is scheduled. In some embodiments, maintaining the graph database comprises updating the graph database to reflect the current state of the automation environment. In further embodiments, the graph database is updated periodically. In other embodiments, the graph database is updated substantially continuously or continuously. In some embodiments, the software agents are in-band. In other embodiments, the software agents are out-of-band. In some embodiments, the automation environment comprises at least one networked industrial or commercial automation system. In various embodiments, the plurality of data sources comprises at least one sensor, at least one actuator, at least one effector, at least one programmable logic controller (PLC), at least one automation controller, at least one data file, at least one cloud service, or a combination thereof. In various embodiments, the plurality of data sources comprises at least 1,000, at least 10,000, or at least 100,000 data sources. In various embodiments, the algorithm comprises a statistical analysis, a machine learning model, or a combination thereof. In some embodiments, generating a specific data enrichment comprises requesting creation, update, or deletion of one or more vertices in the graph, one or more edges in the graph, one or more vertex properties in the graph, or one or more edge properties in the graph. In some embodiments, generating a specific data enrichment comprises requesting update or deletion of a previous data enrichment. In some embodiments, contributing the generated data enrichment back to the graph database comprises merging a delta from the specific data enrichment into the graph database. In some embodiments, each vertex in the graph database includes a timeseries store to capture data changes over time. In further embodiments, the vertices, the edges, vertex properties, edge properties. and underlying data are substantially continuously updated to reflect the state of the automation environment. In further embodiments, applying the algorithm to identify patterns in the graph database comprises identifying patterns in the graph, the timeseries, or both the graph and the timeseries. In some embodiments, the method further comprises providing one or more APIs or one or more real-time streams to provide access to the enriched graph database. In some embodiments, the enrichments are contributed back to the graph database by origin tagging, wherein the origin tagging identifies the software agent that generated the enrichment. In some embodiments, the steps are performed by a computer-based platform automatically and substantially continuously.

In another aspect, disclosed herein are systems comprising at least one computing device comprising at least one processor, a memory, and instructions executable by the at least one processor to create an application comprising: a graph database, maintained in a data store, comprising a representation of a current state of an automation environment comprising a plurality of data sources, wherein the data sources are represented as vertices in the graph database and relationships between the individual data sources are represented as edges in the graph database; a plurality of software agents, each software agent configured to perform operations comprising: applying an algorithm to identify patterns in the graph database; and generating a specific data enrichment based on one or more identified patterns; and a software module contributing the generated data enrichment back to the graph database. In some embodiments, the graph database comprises a digital twin of the automation environment. In some embodiments, the application further comprises a software module receiving updates to the graph database, each update reflecting a current state of at least one data source of the automation environment. In further embodiments, the software module receiving updates to the graph database receives updates as a result of polling of the graph through queries, polling of a changelog, receiving a real-time feed of changes, or a combination thereof. In further embodiments, the polling is scheduled. In some embodiments, the application further comprises a software module updating the graph database to reflect the current state of the automation environment. In further embodiments, the software module updating the graph database updates the graph database periodically. In other embodiments, the software module updating the graph database updates the graph database substantially continuously or continuously. In some embodiments, the software agents are operated in-band. In other embodiments, the software agents are operated out-of-band. In some embodiments, the automation environment comprises at least one networked industrial or commercial automation system. In various embodiments, the plurality of data sources comprises at least one sensor, at least one actuator, at least one effector, at least one programmable logic controller (PLC), at least one automation controller, at least one data file, at least one cloud service, or a combination thereof. In various embodiments, the plurality of data sources comprises at least 1,000, at least 10,000, or at least 100,000 data sources. In various embodiments, the algorithm comprises a statistical analysis, a machine learning model, or a combination thereof. In some embodiments, at least one software agent generates a specific data enrichment by requesting creation, update, or deletion of one or more vertices in the graph, one or more edges in the graph, one or more vertex properties in the graph, or one or more edge properties in the graph. In some embodiments, at least one software agent generates a specific data enrichment by requesting update or deletion of a previous data enrichment. In some embodiments, the software module contributing the generated data enrichment back to the graph database merges a delta from the specific data enrichment into the graph database. In some embodiments, each vertex in the graph database includes a timeseries store to capture data changes over time. In further embodiments, the vertices, the edges, vertex properties, edge properties. and underlying data are substantially continuously updated to reflect the state of the automation environment. In further embodiments, at least one software agent applies the algorithm to identify patterns in the graph database by identifying patterns in the graph, the timeseries, or both the graph and the timeseries. In some embodiments, the application further comprises a software module providing one or more APIs or one or more real-time streams to provide access to the enriched graph database. In some embodiments, the software module contributing the generated data enrichment back to the graph database utilizes origin tagging to identify the software agent that generated the enrichment. In some embodiments, the software modules and agents are implemented at a computer-based platform and operate automatically.

In another aspect, disclosed herein are non-transitory computer-readable storage media encoded with instructions executable by one or more processors to provide an application comprising: a graph database, maintained in a data store, comprising a representation of a current state of an automation environment comprising a plurality of data sources, wherein the data sources are represented as vertices in the graph database and relationships between the individual data sources are represented as edges in the graph database; a plurality of software agents, each software agent configured to perform operations comprising: applying an algorithm to identify patterns in the graph database; and generating a specific data enrichment based on one or more identified patterns; and an enrichment module contributing the generated data enrichment back to the graph database. In some embodiments, the graph database comprises a digital twin of the automation environment. In some embodiments, the application further comprises an update module receiving updates to the graph database, each update reflecting a current state of at least one data source of the automation environment. In various embodiments, the update module receives updates to the graph database as a result of polling of the graph through queries, polling of a changelog, receiving a real-time feed of changes, or a combination thereof. In further embodiments, the polling is scheduled. In some embodiments, the application further comprises an update module updating the graph database to reflect the current state of the automation environment. In further embodiments, the update module updates the graph database periodically. In other embodiments, the update module updates the graph database substantially continuously or continuously. In some embodiments, the software agents are operated in-band. In other embodiments, the software agents are operated out-of-band. In some embodiments, the automation environment comprises at least one networked industrial or commercial automation system. In various embodiments, the plurality of data sources comprises at least one sensor, at least one actuator, at least one effector, at least one programmable logic controller (PLC), at least one automation controller, at least one data file, at least one cloud service, or a combination thereof. In various embodiments, the plurality of data sources comprises at least 1,000, at least 10,000, or at least 100,000 data sources. In various embodiments, the algorithm comprises a statistical analysis, a machine learning model, or a combination thereof. In some embodiments, at least one software agent generates a specific data enrichment by requesting creation, update, or deletion of one or more vertices in the graph, one or more edges in the graph, one or more vertex properties in the graph, or one or more edge properties in the graph. In some embodiments, at least one software agent generates a specific data enrichment by requesting update or deletion of a previous data enrichment. In some embodiments, the enrichment module merges a delta from the specific data enrichment into the graph database. In some embodiments, each vertex in the graph database includes a timeseries store to capture data changes over time. In further embodiments, the vertices, the edges, vertex properties, edge properties. and underlying data are substantially continuously updated to reflect the state of the automation environment. In further embodiments, at least one software agent applies the algorithm to identify patterns in the graph database by identifying patterns in the graph, the timeseries, or both the graph and the timeseries. In some embodiments, the application further comprises an access module providing one or more APIs or one or more real-time streams to provide access to the enriched graph database. In some embodiments, the enrichment module utilizes origin tagging to identify the software agent that generated the enrichment. In some embodiments, modules and agents are implemented at a computer-based platform and operate automatically.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
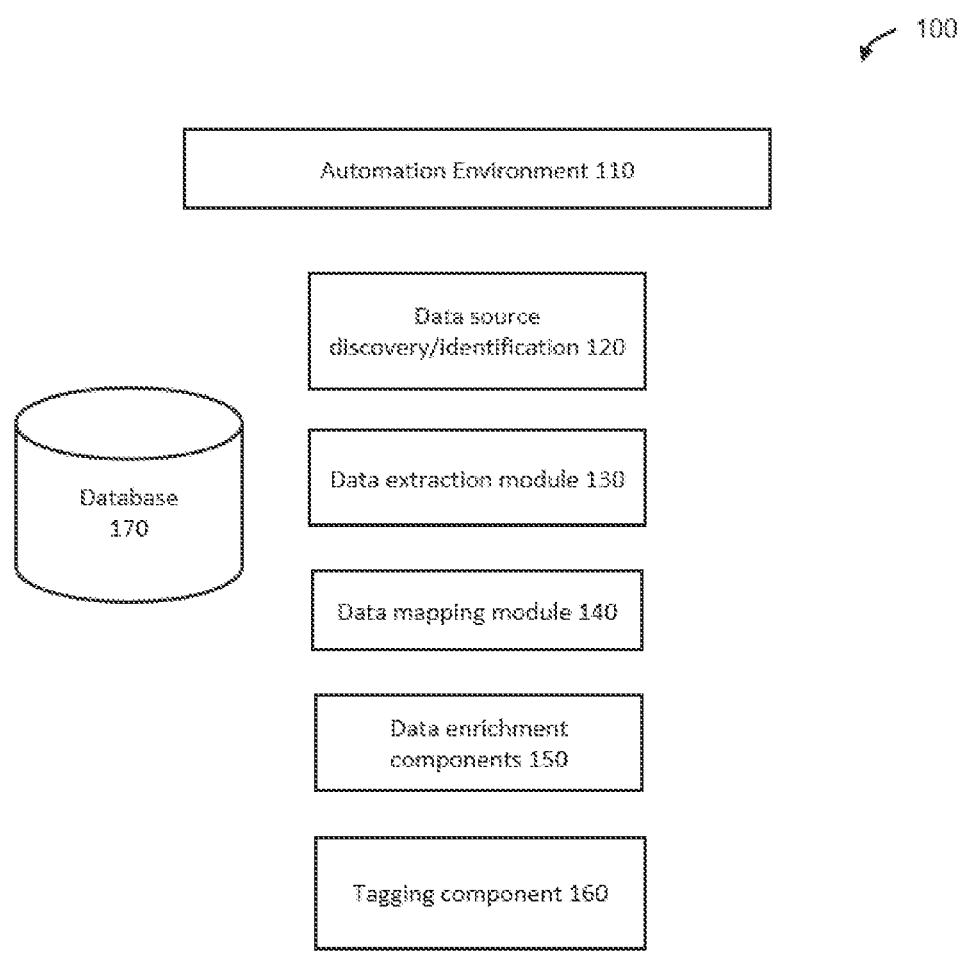
FIG. 1 shows a non-limiting example of a schematic diagram; in this case, a schematic diagram showing components (e.g., modules, mechanisms, etc.) utilized by embodiments described herein.

Described herein, in certain embodiments, are computer-implemented methods comprising: maintaining a graph database comprising a representation of a current state of an automation environment comprising a plurality of data sources, wherein the data sources are represented as vertices in the graph database and relationships between the individual data sources are represented as edges in the graph database; operating a plurality of software agents, each software agent configured to perform operations comprising: applying an algorithm to identify patterns in the graph database; and generating a specific data enrichment based on one or more identified patterns; and contributing the generated data enrichment back to the graph database.

Also described herein, in certain embodiments, are systems comprising at least one computing device comprising at least one processor, a memory, and instructions executable by the at least one processor to create an application comprising: a graph database, maintained in a data store, comprising a representation of a current state of an automation environment comprising a plurality of data sources, wherein the data sources are represented as vertices in the graph database and relationships between the individual data sources are represented as edges in the graph database; a plurality of software agents, each software agent configured to perform operations comprising: applying an algorithm to identify patterns in the graph database; and generating a specific data enrichment based on one or more identified patterns; and a software module contributing the generated data enrichment back to the graph database.

Also described herein, in certain embodiments, are non-transitory computer-readable storage media encoded with instructions executable by one or more processors to provide an application comprising: a graph database, maintained in a data store, comprising a representation of a current state of an automation environment comprising a plurality of data sources, wherein the data sources are represented as vertices in the graph database and relationships between the individual data sources are represented as edges in the graph database; a plurality of software agents, each software agent configured to perform operations comprising: applying an algorithm to identify patterns in the graph database; and generating a specific data enrichment based on one or more identified patterns; and an enrichment module contributing the generated data enrichment back to the graph database.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

Reference throughout this specification to "some embodiments," "further embodiments," or "a particular embodiment," means that a particular feature, structure, or characteristic described in connection with the embodiment is included in at least one embodiments. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Overview of Exemplary Embodiments

The platforms, systems, and methods described herein interact with an automation environment and are implemented with multiple suitable architectures. Non-limiting examples are provided herein.

Referring to FIG. 1, in a particular embodiment, the platforms and systems 100 include, and methods utilize an automation environment 110, a data source discovery/identification module 120, a data extraction module 130, data mapping module 140, data enrichment components 150, and a tagging component 160 in communication with a data storage system 170 (which in some cases comprises a database).

Figure 2:
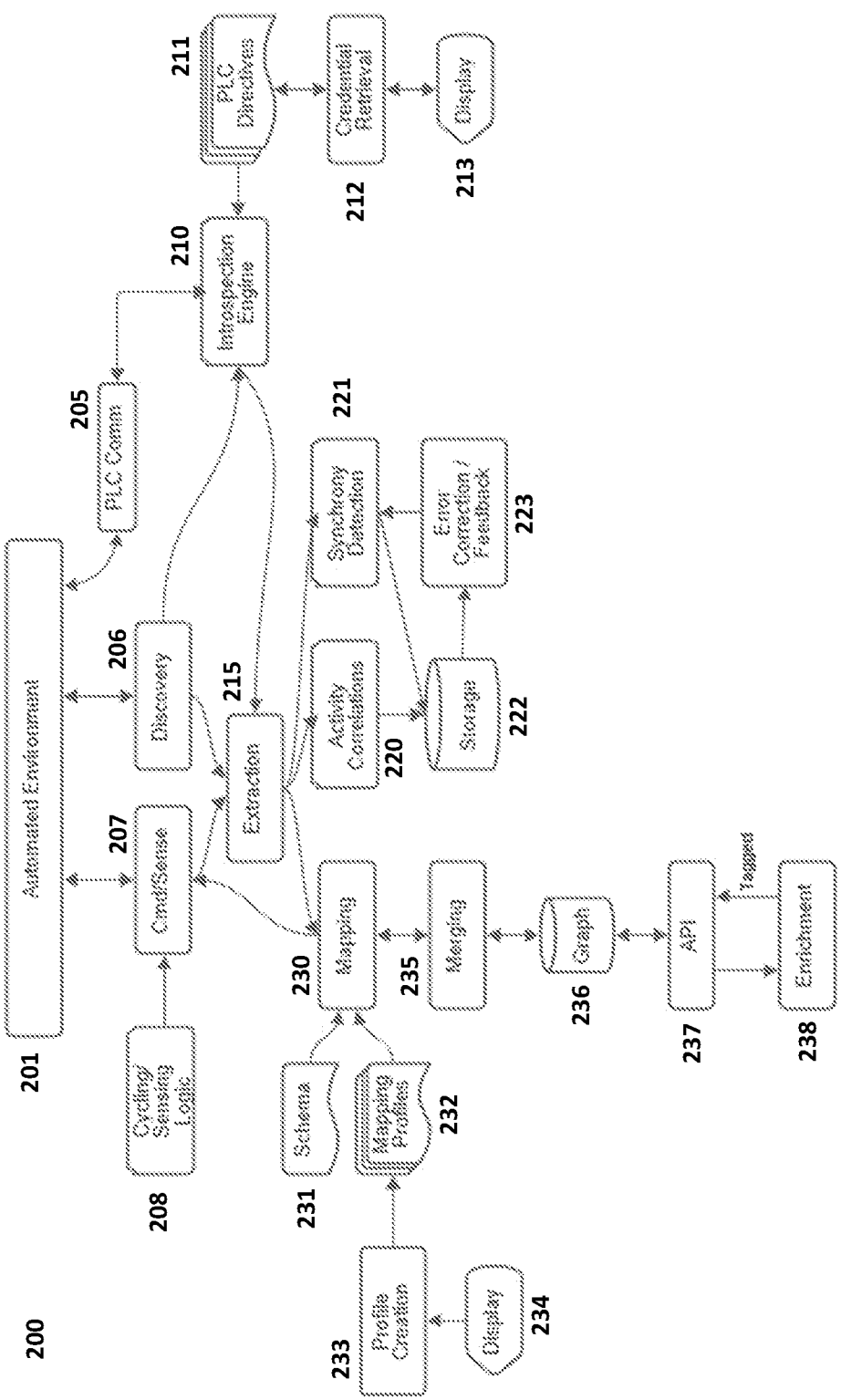
FIG. 2 shows a non-limiting example of a schematic diagram; in this case, a schematic diagram illustrating overall architecture and procedural aspects of the platforms, systems, and methods described herein.

Referring to FIG. 2, in a particular embodiment, the overall platforms and systems 200 are implemented in relation to an automation environment 201, and the methods utilize the automation environment 201. In this embodiment, a discovery module 206 and a command/sense module 207 interact directly with the automation environment 201 to conduct protocols to gain data about the environment and feed the data to an extraction module 215. The discovery module 206 provides data to an introspection engine 210, which communicates with a PLC communications module 205. In this embodiment, the introspection engine 210 receives one or more PLC directives 211, which may require credential retrieval 212 and presentation of an interface for showing credentials on a display 213 and/or receiving credentials, and the introspection engine 210 sends the PLC directives 211 to the PLC communications module 205 for issuance into the automation environment 201. Further, in this embodiment, a cycling/sensing logic module 208 provides instruction to the command/sense module 207 for interaction with the automation environment 201.

Continuing to refer to FIG. 2, in this particular embodiment, the command/sense module 207, the discovery module 206, and the introspection engine 210 provide data to the extraction module 215. In this embodiment, the extraction module 215 provides data to the activity correlations module 220 and the synchrony detection module 221, which are in communication with a storage module 222 and an error correction and feedback mechanism 223. In this embodiment, the extraction module 215 also provides data to the mapping module 230. By way of example, the mapping module 230 receives a mapping schema 231 and one or more mapping profiles 232, which may require profile creation 233 and presentation of an interface for showing profiles on a display 234 and/or receiving profiles. The mapping module 230 utilizes the schema 231 and the one or more profiles 232 to map the data extracted by the extraction module 215 and communicates the output to a merging module 235. Finally, in this embodiment, the merging module 235 is in communication with a graph database 236. An enrichment module 238 provides data enrichments, such as tagging (e.g., origin tagging, etc.), and access to the graph database 236 and the enrichments is provided via one or more APIs 237.

Figure 3:
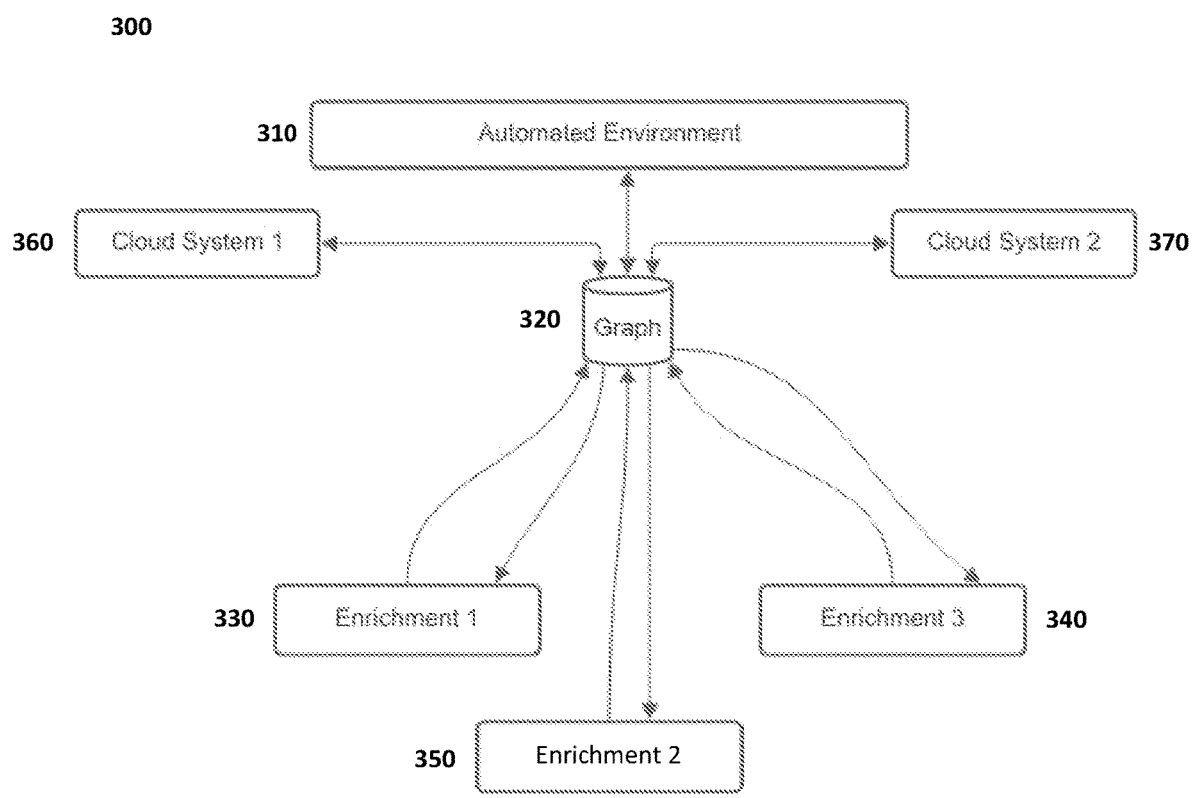
FIG. 3 shows a non-limiting example of a schematic diagram; in this case, a schematic diagram illustrating architecture and procedural aspects of the platforms, systems, and methods for providing an automated data integration pipeline with data storage and enrichment according to embodiments described herein.

Referring to FIG. 3, in a particular embodiment, the graph data enrichment 300 is implemented in relation to an automation environment 310, and the methods utilize the automation environment 310. In this embodiment, a data storage (e.g., graph database) 320 interacts directly with the automation environment 310 to conduct protocols to gain data about the environment and store the data in the data storage 320. The data storage 320 may also interact directly with cloud systems (e.g., could system 1 360 and cloud system 2 370) to conduct protocols to gain data about the cloud systems and store the data in the data storage 320. In some embodiments, the data storage 320 is a graph database. Some data enrichment components may perform a plurality of enrichments (e.g., Enrichment 1 330, enrichment 2 350, enrichment 3 340) and update the graph database 320 with the enrichments.

Figure 4:
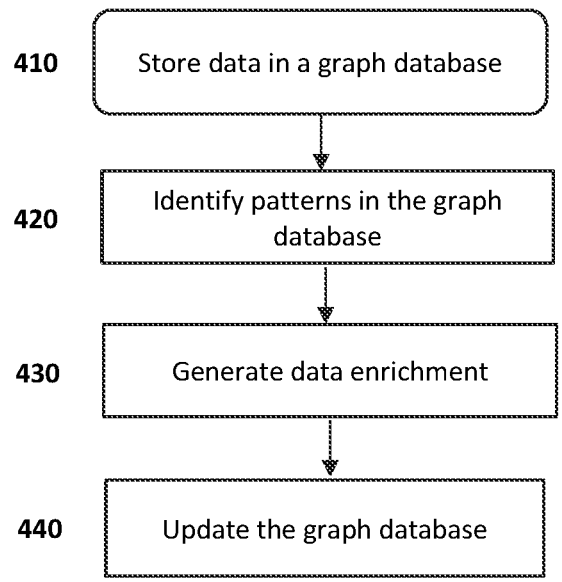
FIG. 4 shows a non-limiting example of a process flow diagram; in this case, a process flow diagram illustrating a data integration, storage, and enrichment process according to embodiments described herein.

Referring to FIG. 4, in a particular embodiment, a process for providing graph data enrichment 400 begins with storing data in a graph database 410. Storage, in this embodiment, comprises storing data sources as nodes (e.g., vertex) and relationships between data sources as edges in a graph database. The next step is to identify patterns 420 in the graph database Next, identified patterns are utilized to generate 430 data enrichment by a plurality of data enrichment components. Once one or more data enrichments are generated, the graph database may be updated by the data enrichments.

Data or Data Source Discovery Mechanism

One component of the platforms and systems described herein, and utilized by the methods described herein is the data or data source discovery mechanism. See, e.g., FIG. 1 at 120 and FIG. 2 at 206. This will vary based on the environment the system is targeting but, in various embodiments, includes one or more of: passive discovery, active discovery, and target interrogation. Passive discovery is typically done by observing network traffic, whether IP, serial, or otherwise, between the potential data sources. When a known protocol is used, the origin and destination are recorded as a potential data source. Active discovery is usually protocol specific, but can range from "whois" commands in protocols like BACnet to IP subnet and port scanning for IP based systems. Again, when a device is found that speaks a desired protocol, it is recorded as a potential data source. Lastly, target interrogation includes actively speaking one or more protocols to a potential target to obtain additional information. In general, a known or discovered device is interrogated to find out about other known devices—and when more devices are found, they are similarly interrogated. Additionally, data sources can also be found in file shares or be manually entered, such as a cloud service.

A particular exemplary methodology for target interrogation is found in U.S. patent application Ser. No. 17/372,275, entitled SUBTENDED DEVICE MAPPING THROUGH CONTROLLER INTROSPECTION, filed on Jul. 9, 2021 and listing as inventors Shaun Cooley, Jose de Castro, and Jason Koh, which is hereby incorporated by reference in its entirety. This exemplary methodology utilizes communication methods set up for programming and configuration of controllers by human technicians. A collection of protocol specific PLC introspection directives is assembled. Each of these directives drives an introspection engine to reach in to the controller to obtain the necessary information. The engine obtains the make/model of a controller, finding the appropriate introspection directives, executing the sequence of commands, and then processing the final output. In this example, the data or data source discovery mechanism discovers devices that are subtended to a controller by masquerading as a human technician in order to obtain the controller's internal configuration and programming.

Data Extraction System

Another component of the platforms and systems described herein, and utilized by the methods described herein is the data extraction mechanism. See, e.g., FIG. 1 at 130, FIG. 2 at 215, and FIG. 3 at 320. After the data or data source discovery mechanism produces a list of potential data sources, the data extraction component is responsible for extracting data from each source. This is done by leveraging the native protocol, such as BACnet, modbus, S7, or other automation protocol that the source is able to speak or respond on, or the file format if pulling data from a file, such as a CSV. In various embodiments, data is retrieved on a schedule, in response to an event, as a result of passively observing communications among data sources, or pushed from the source directly to this extraction component, or some combination of these. As this component receives data, it actively forwards it to the mapping mechanism, which typically transits a network. In preferred embodiments, the receiving end of this data would store the data in its raw form so that the raw data could be replayed in to the system if any of the subsequent components are improved after the data's initial pass through the system.

Data Mapping Mechanism

Another component of the platforms and systems described herein, and utilized by the methods described herein is the data mapping mechanism. See, e.g., FIG. 1 at 140 and FIG. 2 at 230. The mapping mechanism is responsible for mapping data from the source format to an ontology, such as a strongly-typed ontology, used by subsequent components in the pipeline. This component optionally comprises a manually crafted set of mapping rules or logic (including those comprising one or more heuristics) to take a known input schema and produce an output schema, such as an XSLT file (Extensible Stylesheet Language Transformations) or even simple field mapping (A→7). In some embodiments, this mapping mechanism optionally comprises complex machine learning based transformation that is trained from interactive data transformation performed by humans or by the data integration pipeline, which improves over time. Example machine learning models include, by way of examples, regular or deep neural networks, support vector machines, Bayesian models, linear regression, logistic regression, k-means clustering, or the like.

A particular exemplary methodology for mapping and normalizing extracted data is found in U.S. patent application Ser. No. 17/372,256, entitled DATA MAPPING BASED ON DEVICE PROFILES, filed on Jul. 9, 2021 and listing as inventors Shaun Cooley, Jose de Castro, and Jason Koh, which is hereby incorporated by reference in its entirety. This exemplary methodology utilizes a data mapping mechanism positioned between the discovered devices and the target schema or ontology and is responsible for converting the data extracted from devices to the target ontology by applying device mapping profiles that were looked up in the storage and lookup system for device mapping profiles using the make/model/firmware or fingerprint of extracted from the device providing data.

Data Storage Mechanism (Graph Database)

Another component of the platforms and systems described herein, and utilized by the methods described herein is the data storage mechanism. See, e.g., FIG. 1 at 170, FIG. 2 at 236, and FIG. 3 at 320. In some embodiments, the data storage comprises one or more digital twins between a pair of the data sources in the automation environment. In some embodiments, a combination of a graph database and a time-series database may be used by the storage mechanism. A time-series database may reflect the data changes of data sources overtime. In preferred embodiments, a graph database is used wherein each vertex (e.g., node) in the graph represents a data source (e.g., an IoT device), and each edge represent a relationship between the two connecting nodes (e.g., data sources). Further, it is preferable to have a graph database which is able to structure and store data from outside of the graph, i.e., creating nodes and edges based on data newly-discovered and newly-extracted and processed. A graph database is a database that uses graph structure for semantic queries with nodes (please note that "node" and "vertex" are used interchangeably in this application), edges, and properties to represent and store data. The data storage component of the present subject matter provides a data structure wherein each vertex (node) in the graph also has a time-series store to capture state changes overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present subject matter) and the value is 27° C. The timestamp 8 PM on Jan. 27, 2021 is stored as property for this node in the graph of the graph database. The time-series store may be associated with the nodes, and it may reflect the state changes overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an event or state change associated with sensor O. In some embodiments, these events or state changes may be utilized to determine a digital twin between data sources. These events or state changes associated with every IoT devices are observed by the present platforms and systems to determine patterns as described in more details below in connection with data enrichment components (software agents).

Data Enrichment Components (Software Agents)

Another component of the platforms and systems described herein, and utilized by the methods described herein is data enrichment components (e.g., software agents). See, e.g., FIG. 1 at 150, FIG. 2 at 238, and FIG. 3 at 330, 340, 350. In some embodiments, the data enrichment components/software agents may apply an algorithm to the data stored in the graph database to identify patterns and enrich the data based on the identified patterns. The data enrichment components/software agents may be in-band or out-of-band agents. There may be different types of data enrichment components, and each type may generate a specific type of enrichment for one or more purposes. In general, these enrichment mechanisms look for patterns in the graph, the timeseries, or both through mechanisms such as simple pattern matching, statistical analysis, machine learning, or even human processing.

One exemplary methodology utilizes a mechanism to allow downstream processing of graph structure and data to feed back into the graph in order to benefit all other users of the graph through real-time enrichment of vertices, edges, and related data within the graph database. First, in this example, updates to the graph, timeseries data, or both are received, e.g., by scheduled polling of the graph or timeseries data through queries, polling of a changelog, or a real-time feed of changes in the graph or timeseries data being pushed to interested parties (local to the graph or remote). Second, in this example, data enrichments are produced, e.g., by one or more mechanisms in or out-of-band. In preferred embodiments, multiple instances of data enrichment mechanisms are each configured to produce a specific enrichment and receive graph or timeseries data updates and analyze the new state of the graph through rules based, heuristic, statistical, or machine learning based systems to determine if an enrichment should be created, updated, or deleted. Finally, in this example, enrichments are contributed back to the graph database, timeseries data, or both with origin tagging, e.g., by receiving a stream of vertex, edge, and property creation, update, and delete requests from the various instances of the data enrichment(s) components, and merging the deltas into the graph. In preferred embodiments, each delta merged into the graph is tagged with the identity of the enrichment component (e.g., software agent) that created it (e.g., origin tagging) so that future updates or deletions can be properly applied, thus avoiding duplicate or abandoned elements in the graph.

Further examples of data enrichment are provided in U.S. patent application Ser. No. 17/372,238, entitled AUTOMATIC DISCOVERY OF RELATIONSHIPS AMONG EQUIPMENT THROUGH AUTOMATED CYCLING AND OBSERVATION, filed on Jul. 9, 2021 and listing as inventors Shaun Cooley, Jose de Castro, and Jason Koh, U.S. patent application Ser. No. 17/372,242, entitled AUTOMATIC DISCOVERY OF RELATIONSHIPS AMONG EQUIPMENT THROUGH OBSERVATION OVER TIME, filed on Jul. 9, 2021 and listing as inventors Shaun Cooley, Jose de Castro, and Jason Koh, and U.S. patent application Ser. No. 17/372,267, entitled AUTOMATIC DISCOVERY OF AUTOMATED DIGITAL SYSTEMS THROUGH LINK SALIENCE, filed on Jul. 9, 2021 and listing as inventors Shaun Cooley, Jose de Castro, and Jason Koh, each of which are hereby incorporated by reference in its entirety.

Algorithms (e.g., for Identifying the Patterns Between Data Sources)

Another component of the platforms and systems described herein, and utilized by the methods described herein are algorithms for identifying patterns of the mapped data and enrich the data based on the identified patterns. In some other embodiments, the software agent may apply an algorithm to both the graph and an associated time-series database to identify patterns in the graph, the time-series, or both the graph and the time-series. In these example, an algorithm may query the time-series database for the data changes for one or more data sources. In some embodiments, the algorithm comprises a statistical analysis, a machine learning (ML) model, or a combination thereof. One or more data enrichment components (e.g., software agents) may identify patterns by querying the data storage system. As described above, mapped data associated with data sources may be stored in a graph database by nodes and property associated with the nodes, in a format that nodes represent data sources and property represents a value associated with the data source respectively. In some embodiments, the relationships between data sources are not readily known, and the data enrichment components (e.g., software agents) may identify patterns to learn the relationships between different data sources. For example, a machine learning (ML) algorithm may be deployed/applied to the graph database to analyze data and determine the relationships between data sources. In some embodiments, the ML algorithm may extract metadata from data source to understand field content. Further, the ML algorithm may inquiry the time-series associated with the nodes (data sources) to capture events or state changes associated with data sources. These events or state changes may be input to the ML algorithm to identify a pattern, a correlation, and/or a relationship between different data sources (e.g., relationship between IoT device A and IoT device B). Any determined patterns, correlations, and/or relationships may be used by the data enrichment components (e.g., software agents) to generate a specific data enrichment (such as Enrichment 1 330, Enrichment 2 350, Enrichment 3 340 in FIG. 3). Any determined patterns, correlations, and/or relationships may be training examples that can be used to train the ML algorithm. If a specific data enrichment is a relationship between data sources, this relationship may be stored as edges in a graph database, wherein each data sources may be stored as nodes in the graph database. In some other embodiments, the data enrichment components (e.g., software agents) may be configured to generate other types of data enrichment, such as a value change of a node (data source). For example, a particular data enrichment component may be configured to detect location changes associated with one or more data sources (e.g., IoT devices). In these examples, once the detected location change of a data source (e.g., IoT device No. 1) is above a threshold, the particular data enrichment component (software agent No. 1) may generate a data enrichment indicating there is a location change associated with the data source (e.g., IoT device No. 1). This enrichment may be stored in the graph database as a change to the value (e.g., property) of a node (represents a data source, in this case, IoT device No. 1). The above operations may be optimized by deploying a tagging component, which is described in more details below.

Updates to Graph

Another component of the platforms and systems described herein, and utilized by the methods described herein is the updating function aspect of the data enrichment components. As elaborated above, a graph database may be utilized to represent the data structure associated with data sources, and it can a static representation and used by downstream components. The present platforms and systems may provide a living representation of the data by updating the graph/graphs in a graph database.

In some embodiments, the present platforms and systems maintain a graph database comprising a representation of a current state of an automation environment comprising a plurality of data sources, wherein the data sources are represented as vertices and the relationships between data sources are represented as edges in the graph database. Some components in the automation environment may perform different types of operations, sometimes these operations may capture developments of the data changes associated with the data sources. In some embodiments, data enrichment components (software agents) may update the graph database with updates that reflect a current state of one or more of the data sources of the automation environment. In some embodiments, the updates to the graph database may be received as a result of polling of the graph database through queries, pooling of a changelog, receiving a real-time feed of changes, or a combination thereof, and the polling may be scheduled. For example, the data enrichment components (e.g., software agents) may query the data storage systems (graph database) for relationships (i.e., edges) between data source A and data source B, and the associated time-series database (e.g., a changelog) associated with these data sources. The previously-stored edge (relationship) between data source A and data source B may have changed, and the change is reflected by the changelog and may be determined by the data enrichment components (e.g., software agents) via an algorithm. This change constitutes a new data enrichment, and may be deployed to update the graph database. In some other embodiments, maintaining the graph database comprises updating the graph database to reflect the current state of the automation environment. The updates may be performed periodically or substantially continuously or continuously. For example, the data enrichment components (e.g., software agents) may monitor the automation environment for any events or state changes associated with each data source, and update the graph database with the events or state changes. In other examples, the data enrichment components (e.g., software agents) may identify patterns, correlations, and/or relationships between data sources based on the newly-monitored events or state changes, generate data enrichments based on the identified patterns, and update the graph database with the newly-generated data enrichments. In some embodiments, generating a specific data enrichment comprises requesting creation, update, or deletion of one or more of the vertices (nodes) or properties (e.g., node property, edge property) in the graph database. In some other embodiments, generating a specific data enrichment comprises requesting update or deletion of a precious data enrichment. In further embodiments, updating/contributing the generated data enrichment back to the graph database comprises merging a delta from the specific data enrichment into the graph database. In some embodiments, each vertex (node) in the graph database includes a time-series store to capture the data changes over time, wherein the vertices, the edges, vertex properties, edge properties and underlying data are substantially continuously updated to reflect the state of the automation environment.

Tagging Component

Another component of the platforms and systems described herein, and utilized by the methods described herein is a tagging component. See, e.g., FIG. 1 at 160. In some embodiments, the tagging component may provide origin tagging identifies the particular data enrichment component (software agent) that generate the enrichment. As described above, there may be multiple types of data enrichment components (e.g., software agents), each performs a different type of data enrichments. Some enrichments may be configured to capture a relationship between data sources, and other enrichment may be configured to capture an event or state change of an individual data source. The tagging component may tag the data enrichment component that produced a data enrichment. As described above, updates to a graph database includes requesting an update or a deletion of a previous data enrichment. Therefore, by utilizing a tagged data enrichment component associated with previous data enrichments, the present platforms and systems may allow a more efficient way to update the graph database with data enrichments comparing to a non-tagged system. For example, when there is an update or a deletion of a previous data enrichment, and the previous data enrichment was generated by a tagged data enrichment component (e.g., data enrichment component No. 2), the present platforms or systems do not need to query the entire graph database to update the previous data enrichment, only the enrichments associated with data enrichment component No. 2 need to be queried and updated.

APIs and Streams for Accessing the Normalized, Merged, and Enriched Data

Another component of the platforms and systems described herein, and utilized by the methods described herein is one or more APIs and/or real-time data streams and/or live data feeds. See, e.g., FIG. 2 at 237. The last component needed for the platforms, systems, and methods described herein is some combination of APIs and streams for accessing the normalized, merged, and enriched data. While this data pipeline adds immense value to the original raw data that entered the pipeline, the resulting data would be useless if it couldn't be accessed. In various embodiments, the final destination of the processed data is other applications, running either locally or remotely, that will access the data either by polling an API for new data or using a callback, webhook, or web socket type mechanism to receive a stream of data in real-time. These applications must also be aware of any enrichments that came into existence after the initial delivery of data, so all delivered data must be uniquely identifiable so subsequent updates can be correlated.

In a preferred embodiment, this pipeline can also process data in reverse to push changes that are made to the data storage system, by enrichment mechanisms or other users of the API, back through the merging and mapping component and in to the automation environment as commands.

Computing System

Figure 5:
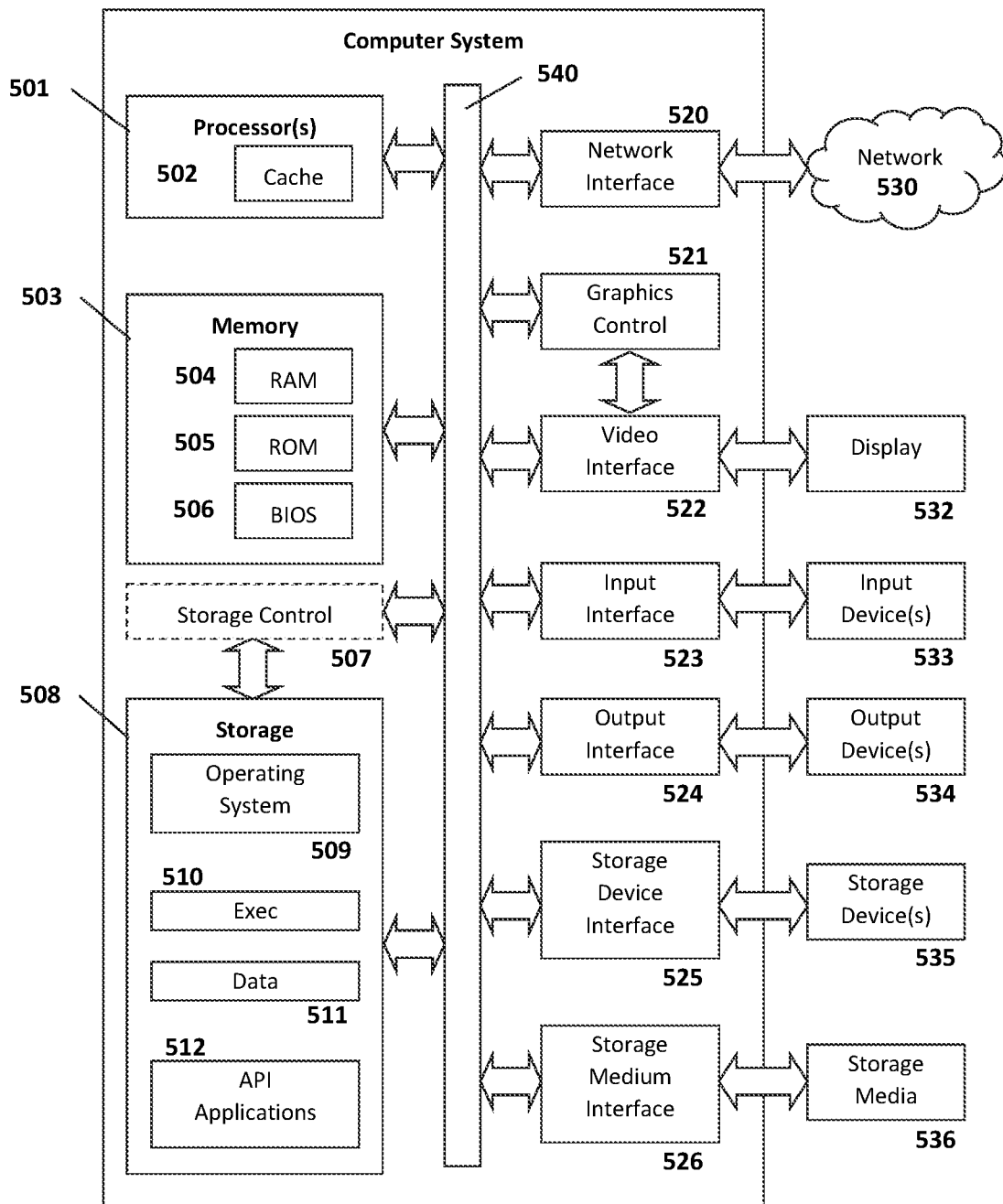
FIG. 5 shows a non-limiting example of a computing device; in this case, a device with one or more processors, memory, storage, and a network interface.

Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for static code scheduling of the present disclosure. The components in FIG. 5 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. The network 530 may comprise ethernet, IP, serial buses, and other forms of communication between two or more IoT devices. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, event information, state change information, combinatorial pair information, algorithm information, and relationship information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example 1—Use Case

In one of the user cases, Company A buys a Factory B, or Company A is looking to integrate data of an existing facility Factory B with another set of data (e.g., data from a Warehouse C also owned by Company A) to provide better visibility of the operation of Factory B and/or Warehouse C. In many instances, Factory B and Warehouse C may include a number of pieces of equipment that are connected to the internet that facture an IP address, i.e., IoT devices. IoT devices often interact with each other and generate huge volumes of data. This data has the potential of providing invaluable information to the operators of Factory B and Warehouse C, and the management team of Company A. In this scenario, the accumulated data associated with IoT devices may be generated across a long period of time according to different standards by different service providers. These piece of data may be stored in a graph database once extracted and mapped to an ontology. The graph database may comprise a representation of a current state of an automation environment, wherein each node (vertices) in the graph represents a data source (e.g., IoT device), each edge of the data graph represents a relationship between the connecting nodes. This graph database generally represents a static structure of the data stored, and may be queried by downstream applications. However, the graph database may not benefit from the operations of the downstream applications because the results of these applications do not necessarily feed back to update the graph database.

In some embodiments, the storage systems described herein may comprise digital twins between a pair of the data sources in the automation environment. For example, if the platforms and system described herein determines that two IoT devices are digital twins, it may mark this relationship and store it in the graph database. In some other embodiments, the graph database is able to structure and store data from outside of the graph, i.e., from the operations of other components associated with the platforms and systems of present disclosure, to create nodes and edges based on data newly-discovered and newly-extracted and processed. As described above, the data storage component of the present disclosure provides a data structure wherein each vertex (node) in the graph also has a time-series store to capture state changes overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present subject matter) and the value is 27° C. The timestamp 8 PM on Jan. 27, 2021 is stored as property for this node in the graph of the graph database. The time-series store may be associated with the nodes, and it may reflect the state changes overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an event or state change associated with sensor O. In some embodiments, these events or state changes may be utilized to determine a digital twin between data sources. These events or state changes associated with every IoT devices are observed by the present platforms and systems to determine patterns between data sources, and the patterns may be utilized to determine whether there is a data enrichment available, as described in more details below.

In some embodiments, software agents may be deployed to generate data enrichment. For example, the software agents (e.g., data enrichment components) may apply algorithms to data stored in graph database to identify patterns between data sources and enrich the graph based on the identified patterns. There are a number of ways to identify the patterns. In one example, the platforms or systems of the present disclosure may i) invoke a cycling command in the automation environment, for example, a cycling command which changes the state of one of the data source (such as turn off one of the IoT device), and ii) monitor the state changes associated with other data sources in the automation environment. In other embodiments, the platforms or systems of the present disclosure may identify the patterns by i) observing the automation environment over time to spot correlations between data sources, and ii) apply algorithms to the correlations to determine whether a valid pattern in the automation environment is available. Once the software agent identifies the patterns in the graph database, it may generate a specific data enrichment. Notice that these software agents may be in-band or out-of-band.

One exemplary methodology utilizes a mechanism to allow downstream processing of graph structure and data to feed back into the graph in order to benefit all other users of the graph through real-time enrichment of vertices, edges, and related data within the graph database. First, in this example, updates to the graph, timeseries data, or both are received, e.g., by scheduled polling of the graph or timeseries data through queries, polling of a changelog, or a real-time feed of changes in the graph or timeseries data being pushed to interested parties (local to the graph or remote). Second, in this example, data enrichments are produced, e.g., by one or more mechanisms in or out-of-band. In preferred embodiments, multiple instances of data enrichment mechanisms are each configured to produce a specific enrichment and receive graph or timeseries data updates and analyze the new state of the graph through rules based, heuristic, statistical, or machine learning based systems to determine if an enrichment should be created, updated, or deleted. For example, one type of data enrichment component (software agent) may be designed to target location changes and generate data enrichment based on the location changes associated with data sources. Another type of data enrichment component may be designed to target relationship changes and generate data enrichment based on relationship changes between data sources. To be more specific, a particular data enrichment component may be configured to detect location changes associated with one or more data sources (e.g., IoT devices). In this example, once the detected location change of a data source (e.g., IoT device No. 1) is above a threshold, the particular data enrichment component (software agent No. 1) may generate a data enrichment indicating there is a location change associated with the data source (e.g., IoT device No. 1). This enrichment may be stored in the graph database as a change to the value (e.g., property) of a node (represents a data source, in this case, IoT device No. 1).

Beneficially, when the software agent generates a data enrichment, the platforms and systems of the present disclosure may update the graph database according to the data enrichment. By updating the graph database, the platforms and systems of the present disclosure may benefit from the downstream applications as these applications may provide actionable insight to the data graph. Further, the subsequent operations of the downstream applications can also benefit from an updated database reflecting the most recent state of the data sources. To gain these benefits, the software agents (e.g., data enrichment components) may update the graph database with data enrichments in various ways, as described in more details below.

In some embodiments, data enrichment components (software agents) may update the graph database with updates that reflect a current state of one or more of the data sources of the automation environment. In some embodiments, the updates to the graph database may be received as a result of polling of the graph database through queries, pooling of a changelog, receiving a real-time feed of changes, or a combination thereof, and the polling may be scheduled. For example, the data enrichment components (e.g., software agents) may query the data storage systems (graph database) for relationships (i.e., edges) between data source A and data source B, and the associated time-series database (e.g., a changelog) associated with these data sources. The previously-stored edge (relationship) between data source A and data source B may have changed, and the change is reflected by the changelog and may be determined by the data enrichment components (e.g., software agents) via an algorithm. This change constitutes a new data enrichment, and may be deployed to update the graph database. For example, data source A may be a portable heater, and data source B may be a temperature sensor near data source A on day one. There may be a relationship between the on/off status of the portable heater (data source A) and the temperature sensor (data source B), and this relationship is stored as edge between data source A (node A) and data source B (node B) in the graph database. Overtime, the portable heater may be moved to another location that is far away from the temperature sensor, and the relationship between them changes. The software agent (data enrichment component) may generate a data enrichment to remove the relationship between data source A and data source B in this case.

In some other embodiments, maintaining the graph database comprises updating the graph database to reflect the current state of the automation environment. The updates may be performed periodically or substantially continuously or continuously. For example, the data enrichment components (e.g., software agents) may monitor the automation environment for any events or state changes associated with each data source, and update the graph database with the events or state changes. In other examples, the data enrichment components (e.g., software agents) may further identify patterns, correlations, and/or relationships between data sources based on the newly-monitored events or state changes, generate data enrichments based on the identified patterns, and update the graph database with the newly-generated data enrichments. In some embodiments, generating a specific data enrichment comprises requesting creation, update, or deletion of one or more of the vertices (nodes) or properties (e.g., node property, edge property) in the graph database. In some other embodiments, generating a specific data enrichment comprises requesting update or deletion of a precious data enrichment. In further embodiments, updating/contributing the generated data enrichment back to the graph database comprises merging a delta from the specific data enrichment into the graph database. In some embodiments, each vertex (node) in the graph database includes a time-series store to capture the data changes over time, wherein the vertices, the edges, vertex properties, edge properties and underlying data are substantially continuously updated to reflect the state of the automation environment. Therefore, the present platforms and systems may provide a living representation of the data by updating the graph/graphs in a graph database.

As described elsewhere herein, the platforms and systems of the present disclosure may update the graph database with newly-generated data enrichments, and the data enrichment components may perform to generate different types of data enrichments. Therefore, it is beneficially to update a subset of the graphs in the graph database based on the newly-generated data enrichments, instead of monitoring and updating the overall graph database. Provided herein is a tagging components that may identifies the particular data enrichment component (software agent) that generated a subset of the data enrichments stored in the graph database. As described elsewhere herein, there may be multiple types of data enrichment components (e.g., software agents), each performs a different type of data enrichments. Some enrichments may be configured to capture a relationship between data sources, and other enrichment may be configured to capture an event or state change of an individual data source. The tagging component may tag the data enrichment component that produced a data enrichment. As described above, updates to a graph database includes requesting an update or a deletion of a previous data enrichment. Therefore, by utilizing a tagged data enrichment component associated with previous data enrichments, the present platforms and systems may allow a more efficient way to update the graph database with data enrichments comparing to a non-tagged system. For example, if data enrichment component A generated five (5) data enrichments, wherein one of them indicates a relationship between two data sources, e.g., data source P (e.g., an IoT device, such as a heating system) is the cause of the change of data source Q (e.g., another IoT device, such as a temperature sensor). This relationship may have been stored in the graph database as a directional edge (because it indicates a causal relationship, thus it is directional) between the node representing data source P and the node representing data source Q. This directional edge is probably one of thousands, or even millions edges in the graph database. If the platforms and system described herein does not utilize a tagging component, it may have to query the entire database to make an update should there be one. The relationship between data source P and data source Q may change, for example, if the heating system (data source P) is a portable one and has been moved away from the temperature sensor (data source Q), then the relationship between may not exist anymore, i.e., the reading of the temperature sensor does not reflect the on/off state of the heating system anymore. In this example, the previously-stored edge between data source P and data source Q, which is a data enrichment generated by data enrichment component A needs to be deleted. With the aid of the tagging component, the platforms and systems of present disclosure may query the graph database to identify the data enrichment that by data enrichment component A generated, which are the five (5) data enrichments in this example, and then delete the edge between data source P and data source Q. While some examples of deleting data enrichments are provided, it will be appreciated that other forms of updating the graph database may be utilized to facilitate the functionalities of the platforms and systems of present disclosure, such as adding data enrichment, changing an existing data enrichment, and the like.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
   a) maintaining a graph database comprising a representation of a current state of an automation environment comprising a plurality of data sources, wherein the data sources are represented as vertices in the graph database and relationships between the individual data sources are represented as edges in the graph database;
   b) operating a plurality of software agents, each software agent configured to perform operations comprising:
      i. applying an algorithm to identify patterns in the graph database, wherein the algorithm comprises a statistical analysis, a machine learning model, or a combination thereof; and
      ii. generating a specific data enrichment based on one or more identified patterns by requesting creation or deletion of one or more vertices in the graph, one or more edges in the graph, one or more vertex properties in the graph, or one or more edge properties in the graph; and
   c) contributing the generated data enrichment back to the graph database.

2. The method of claim 1, wherein the graph database comprises a digital twin of the automation environment.

3. The method of claim 1, further comprising receiving updates to the graph database, each update reflecting a current state of at least one data source of the automation environment.

4. The method of claim 3, wherein the updates to the graph database are received as a result of polling of the graph through queries, polling of a changelog, receiving a real-time feed of changes, or a combination thereof.

5. The method of claim 4, wherein the polling is scheduled.

6. The method of claim 1, wherein maintaining the graph database comprises updating the graph database to reflect the current state of the automation environment.

7. The method of claim 6, wherein the graph database is updated periodically.

8. The method of claim 6, wherein the graph database is updated substantially continuously or continuously.

9. The method of claim 1, wherein the software agents are in-band.

10. The method of claim 1, wherein the software agents are out-of-band.

11. The method of claim 1, wherein the automation environment comprises at least one networked industrial or commercial automation system.

12. The method of claim 1, wherein the plurality of data sources comprises at least one sensor, at least one actuator, at least one effector, at least one programmable logic controller (PLC), at least one automation controller, at least one data file, at least one cloud service, or a combination thereof.

13. The method of claim 1, wherein the generating a specific data enrichment comprises requesting update or deletion of a previous data enrichment.

14. The method of claim 1, wherein the contributing the generated data enrichment back to the graph database comprises merging a delta from the specific data enrichment into the graph database.

15. The method of claim 1, wherein each vertex in the graph database includes a timeseries store to capture data changes over time.

16. The method of claim 15, wherein the vertices, the edges, vertex properties, edge properties and underlying data are substantially continuously updated to reflect the state of the automation environment.

17. The method of claim 15, wherein the applying the algorithm to identify patterns in the graph database comprises identifying patterns in the graph, the timeseries, or both the graph and the timeseries.

18. The method of claim 1, further comprising providing one or more APIs or one or more real-time streams to provide access to the enriched graph database.

19. The method of claim 1, wherein the enrichments are contributed back to the graph database by origin tagging, wherein the origin tagging identifies the software agent that generated the enrichment.

20. The method of claim 1, wherein the steps are performed by a computer-based platform automatically and substantially continuously.

21. A system comprising at least one computing device comprising at least one processor, a memory, and instructions executable by the at least one processor to create an application comprising:
   a) a graph database, maintained in a data store, comprising a representation of a current state of an automation environment comprising a plurality of data sources, wherein the data sources are represented as vertices in the graph database and relationships between the individual data sources are represented as edges in the graph database;
   b) a plurality of software agents, each software agent configured to perform operations comprising:
      i. applying an algorithm to identify patterns in the graph database, wherein the algorithm comprises a statistical analysis, a machine learning model, or a combination thereof; and
      ii. generating a specific data enrichment based on one or more identified patterns by requesting creation or deletion of one or more vertices in the graph, one or more edges in the graph, one or more vertex properties in the graph, or one or more edge properties in the graph; and
   c) a software module contributing the generated data enrichment back to the graph database.

22. A non-transitory computer-readable storage media encoded with instructions executable by one or more processors to provide an application comprising:
   a) a graph database, maintained in a data store, comprising a representation of a current state of an automation environment comprising a plurality of data sources, wherein the data sources are represented as vertices in the graph database and relationships between the individual data sources are represented as edges in the graph database;
   b) a plurality of software agents, each software agent configured to perform operations comprising:

i. applying an algorithm to identify patterns in the graph database, wherein the algorithm comprises a statistical analysis, a machine learning model, or a combination thereof; and
ii. generating a specific data enrichment based on one or more identified patterns by requesting creation or deletion of one or more vertices in the graph, one or more edges in the graph, one or more vertex properties in the graph, or one or more edge properties in the graph; and c) an enrichment module contributing the generated data enrichment back to the graph database.

* * * * *